March 29, 1955  L. P. MORRIS ET AL  2,705,281
MONITOR
Filed Feb. 12, 1951  3 Sheets-Sheet 1
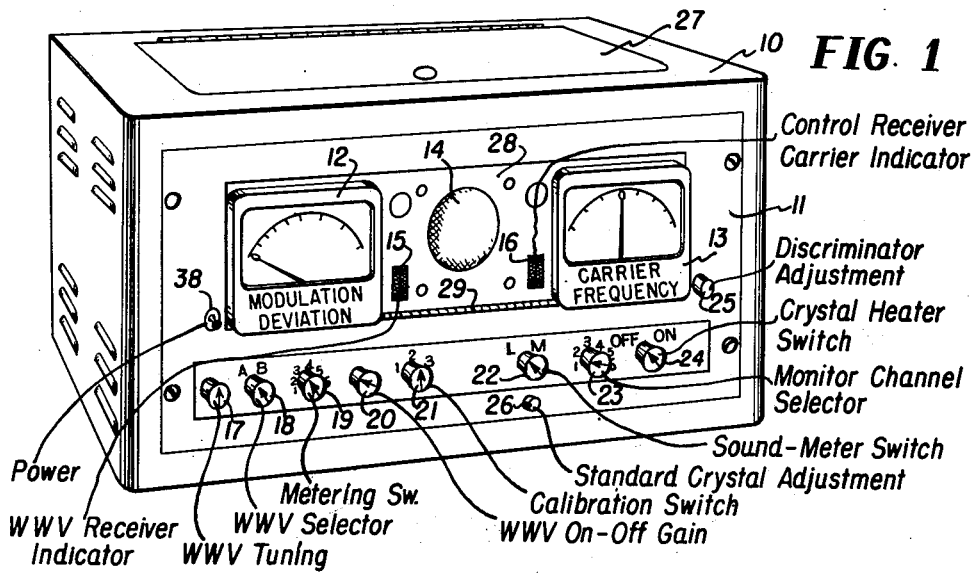
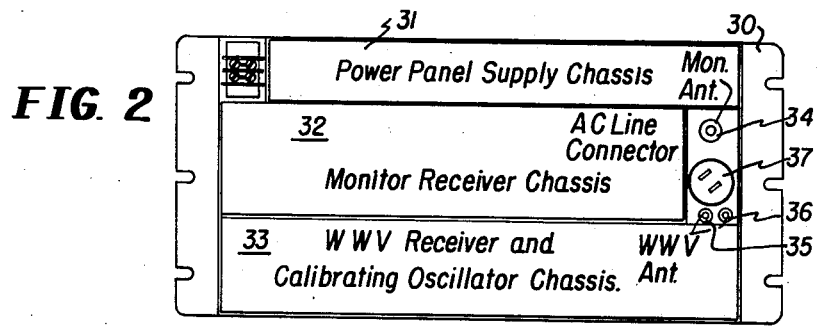
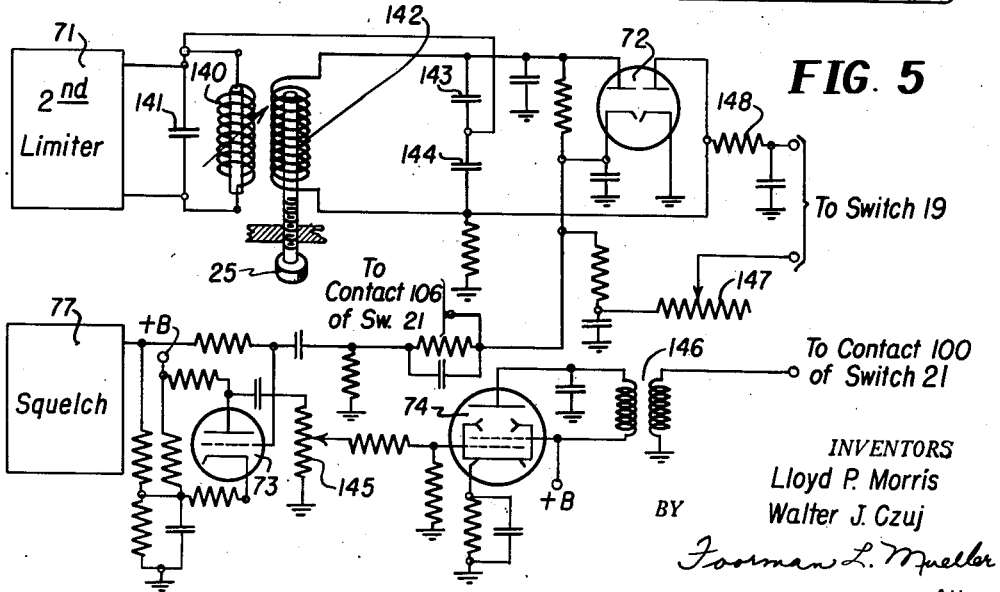
INVENTORS
Lloyd P. Morris
Walter J. Czuj
BY Foorman L. Mueller
Atty.

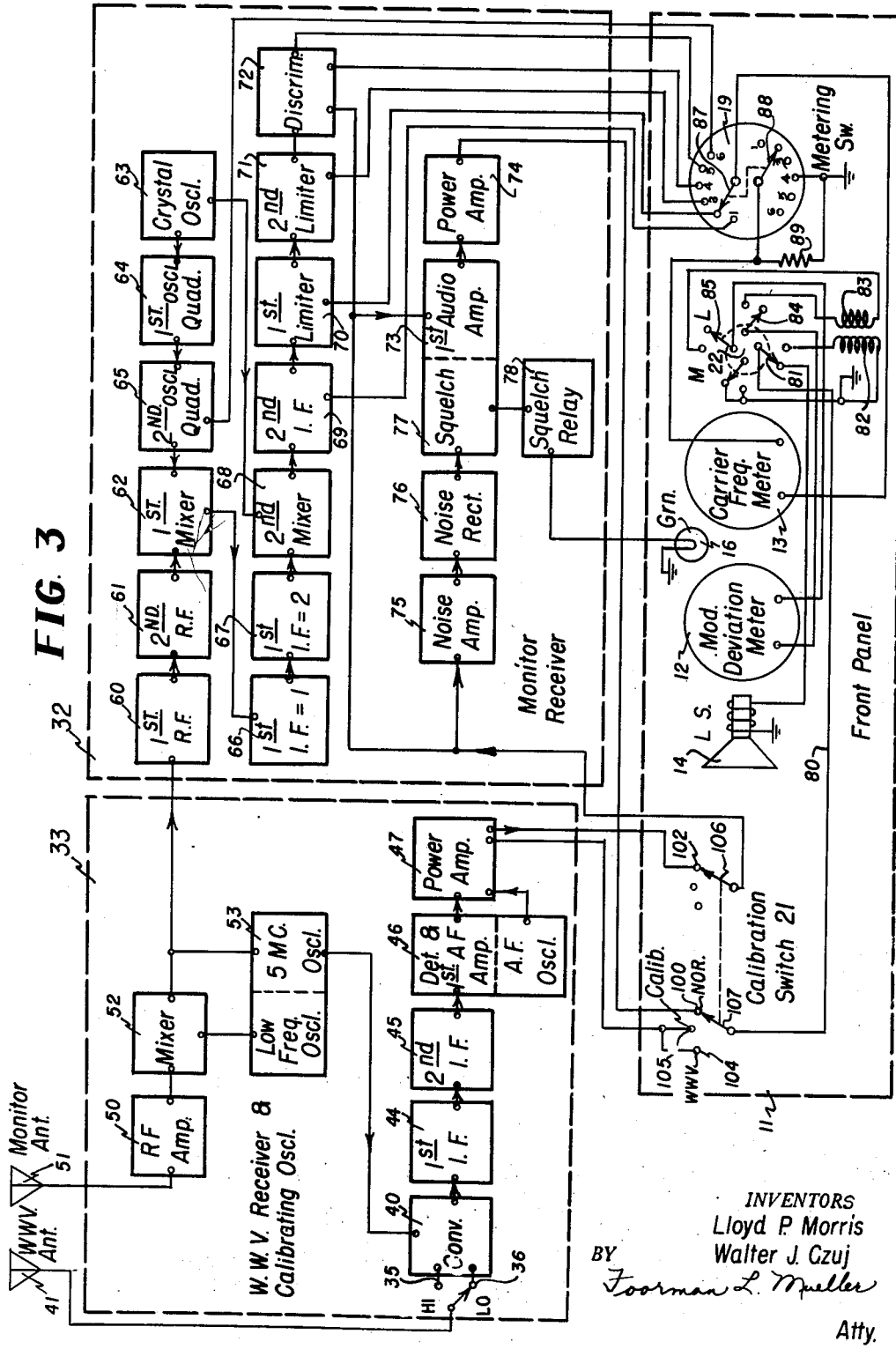

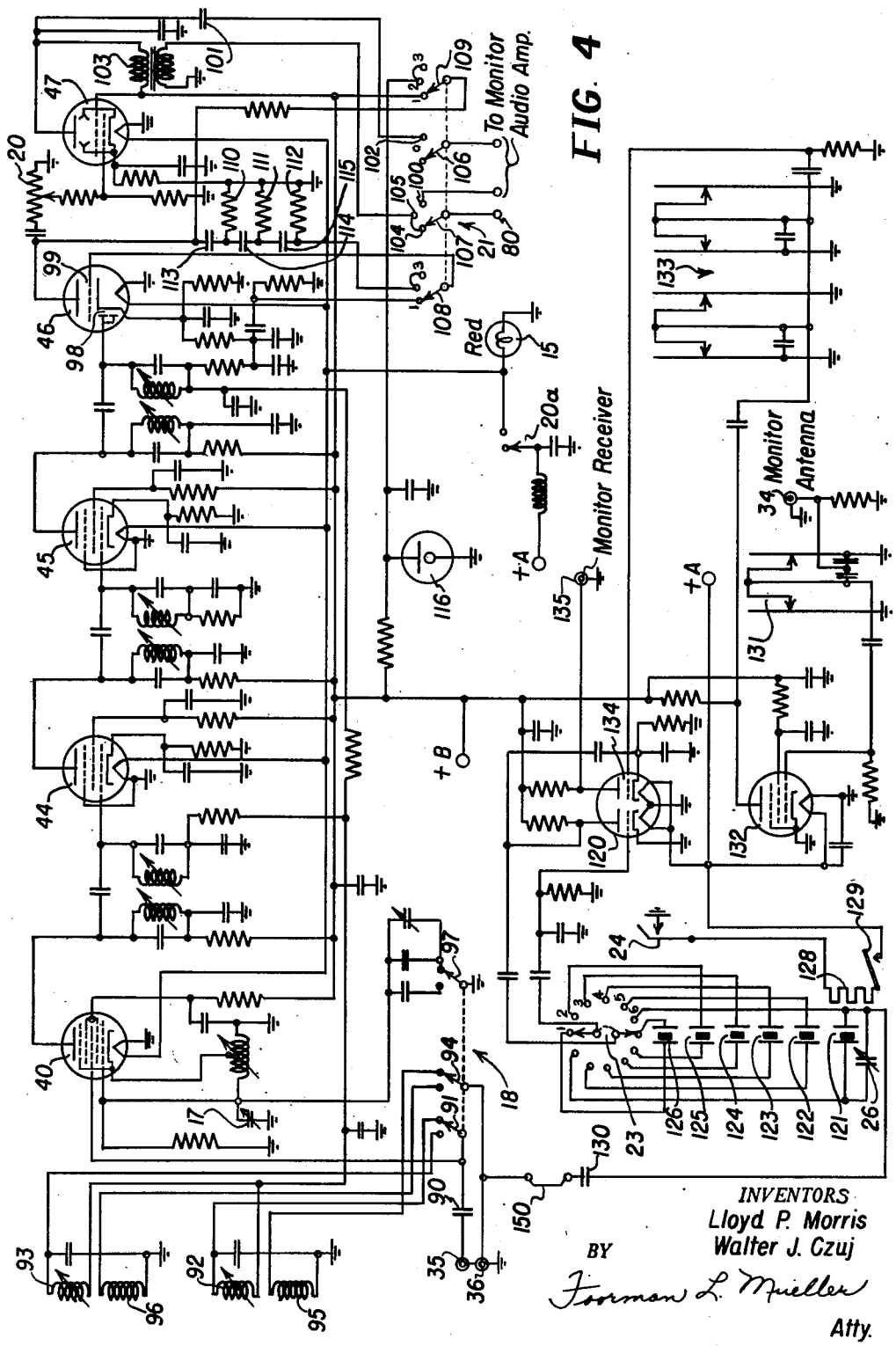

United States Patent Office 2,705,281
Patented Mar. 29, 1955

2,705,281

MONITOR

Lloyd P. Morris, Elmwood Park, and Walter J. Czuj, Chicago, Ill., assignors to Motorola, Inc., Chicago, Ill., a corporation of Illinois Application February 12, 1951, Serial No. 210,456

8 Claims. (Cl. 250—17)

This invention relates generally to monitoring equipment and more particularly to a unit for monitoring frequency modulation signals such as are used for communication purposes by police organizations and the like.

In order to provide dependable communication on assigned channels, it is necessary to monitor the transmitted signals to determine the center frequency of the wave, the strength of the carrier wave, and the amount of the deviation of the carrier wave. All of these factors are governed by regulations of the Federal Communications Commission which require that transmissions be within certain limits in these various respects. Monitoring equipment which has been available has not been completely satisfactory because of several factors. One factor is that it was necessary to have such equipment accurately calibrated at frequent intervals in order to provide the required accuracy. This is necessary because the various components in the equipment change their characteristics and must occasionally be replaced by components which have slightly different characteristics, to thereby cause substantial changes in the overall characteristics of the monitoring equipment. Further, the components are subject to variations due to temperature changes which tends to render the equipment inaccurate. Another difficulty is that the prior equipment has been relatively critical and has not been easy to handle by operators not specially trained to use the equipment. The complexity of the use of the equipment has been increased because various items of equipment must be interconnected to provide the different monitoring operations desired.

It is therefore an object of the present invention to provide an improved monitoring unit for use with frequency modulation signals.

A further object is to provide a single compact monitoring unit which will check the center frequency, deviation, and signal strength of the monitored signal and which has self-contained portions for providing calibration so that the required accuracy can be maintained.

Another object is to provide a monitoring unit which includes means for receiving a signal of a standard frequency for use in calibrating the portion for receiving the monitored signal whereby the receiving portion can be continuously maintained highly accurate.

A still further object of the invention is to provide frequency modulation monitoring equipment including means for calibrating the monitoring receiver portion so that deviation measurements will not be affected by changes in the characteristics thereof.

A feature of the invention is the provision of a monitor unit including a standard frequency receiver portion, a monitor portion and a calibrating oscillator, with switching and metering circuits interconnecting the portions so that the center frequency, signal strength, and deviation of a frequency modulated signal can be checked by the monitor receiver, and the frequency and gain of the monitor receiver can be calibrated without auxiliary equipment. All changes of the connections are made by the switching circuit and no external changes are required.

A further feature of this invention is the provision of monitoring equipment including as a single unit a portion for receiving a standard signal, a portion for receiving the monitored signal, and an oscillator having a crystal circuit including a trimmer which may be adjusted in accordance with the received standard signal and used to calibrate the monitor receiving portion. The crystal oscillator is also used to provide local oscillations which may be mixed with the signal being monitored to provide a signal substantially at the frequency of the monitor receiver.

Another feature of this invention is the provision of a monitoring unit including a portion for receiving the standard frequency signal broadcast by radio station WWV of the National Bureau of Standards, hereinafter referred to as the WWV signal and a monitor receiver which may be aligned with the received standard signal with various indicating devices and interconnecting circuits for indicating the center frequency, signal strength, and deviation of a frequency modulation signal which is monitored. The portion of the unit for receiving the standard signal is also used as an audio frequency oscillator for calibrating the slope of the discriminator curve and the gain of the audio section of the monitor receiver.

Further objects, features and the attending advantages of the invention will be apparent from a consideration of the following description in connection with the accompanying drawings in which:

Fig. 1 is a perspective view illustrating the monitoring unit;

Fig. 2 illustrates the arrangement of the various components of the unit on a chassis;

Fig. 3 is a block diagram illustrating the connection of the components of the monitoring unit;

Fig. 4 is a circuit diagram of the receiver for receiving the standard WWV signal and the crystal oscillator and mixer circuits;

Fig. 5 is a circuit diagram of the discriminator and audio amplifier stages of the control receiver.

In practicing the invention there is provided a single compact monitoring unit which accurately measures the center frequency, signal strength, and deviation of a transmitted frequency modulation signal. The unit may be provided in a compact housing, or on a chassis to be placed in a standard equipment rack. The unit includes a portion for receiving the standard WWV signal, a monitor or control receiver portion which is of the frequency modulation type, an oscillator which includes a plurality of crystals which may be selectively connected to control the oscillator frequency, a radio frequency stage for the monitored signal, a mixer stage for mixing the monitored signal and the local oscillations and switching and metering equipment for interconnecting the components and indicating various characteristics of the signals therein. One of the crystals of the oscillator serves as a standard and is beat with the signal from the WWV receiver and trimmed by a capacitor so that the oscillator frequency is harmonically related to the WWV signal which is received. A harmonic of the oscillator frequency is used for aligning the monitor FM receiver for calibrating the same. The discriminator coils of the monitor receiver are tunable for calibrating the receiver. The signal to be monitored is applied through the radio frequency stage to the mixer and is mixed with the proper oscillator frequency to provide the frequency of the monitoring receiver. The output of the discriminator will therefore indicate any variations of the monitor signal with respect to its designated center frequency. The monitoring unit includes metering provisions for measuring the signal strength of the received signal and also for measuring the modulation. The modulation measurements depend upon the gain of the audio frequency stages of the monitor receiver which will vary with changes in the components, temperature, etc. In order to calibrate the gain of the audio stages, a tuned circuit is provided which can be connected to the audio amplifier of the WWV receiver portion to cause this portion to operate as an audio oscillator. The audio signal derived from the audio oscillator is used together with the metering provisions for calibrating the audio gain of the control receiver. This permits accurate measurement of deviation by the monitor unit.

Referring now to the drawings, in Fig. 1 there is illustrated the modulation unit in accordance with the invention housed in a cabinet for mounting on a table, shelf, or the like. The housing 10 includes a front panel 11 on which are mounted meters 12 and 13, speaker 14, indicator lights 15 and 16, and dials 17 to

ing in the first position as a standard WWV receiver and in the second and third positions as an audio frequency oscillator. Switch 108 connects the feedback circuit including resistors 110, 111 and 112 and condensers 113, 114 and 115 to the amplifier stage including the triode 99 when the calibration switch is in the second and third positions to form an oscillator stage. When in this position the switch contact 109 applies regulated B plus potential from the voltage regulator tube 116 to triode section. When the calibration switch is in the second position the output from the amplifier 47 is applied through contact 105 and movable contact 107 to the conductor 80 which is connected to switch 22 (Fig. 3), and when the switch is in the third position the output from the stage 47 is applied from contact 102 through movable contact 106 to the audio amplifier 73 of the monitor receiver 32 as will be more fully explained. The audio output of the monitor receiver 32 is connected to terminal 100 of the calibration switch, and in the third position is connected through contact 107 to the conductor 80.

The calibrating oscillator 53 is illustrated in Fig. 4 as formed by the triode section 120 with the oscillator being controlled by the crystals 121, 122, 123, 124, 125 and 126. These crystals are selectively connected in circuit by the monitor channel selector switch 23. This switch selectively connects one of the crystals between the grid and plate of the triode section 120, with the crystal 121 being a standard for calibrating purposes and the other crystals providing the frequencies required for monitoring the desired channels. For adjusting the response of the crystal 121, a trimmer condenser 26 is provided and a heater 128 is provided for heating the crystal being connected through thermostatic switch 129 and the heater control switch 24 which is provided on the front panel of the unit. It is to be pointed out that the circuit of the crystal 121 is connected through condenser 130 to the low impedance input terminal of the WWV receiver for a purpose to be described hereinafter.

The circuit of Fig. 4 also includes a portion for receiving the signal to be monitored which is applied to the terminal 34 from the monitor antenna. The signal is selected in the tuned input circuit 131 and is amplified in radio frequency amplifier 132 which includes the tuned circuits 133. This signal is applied to the grid of mixer stage 134 which is included in the same envelope as the triode 120. The output of the oscillator 120 is also applied to the mixer stage 134 for providing a signal of reduced frequency at the terminal 135. This terminal is connected to the input of the monitor receiver.

Referring now to Fig. 5, in this figure there is illustrated in detail the circuit of the discriminator and audio amplifier of the monitor receiver. The output from the limiter 71 is applied to the primary winding 140 across which is connected condenser 141. The coil 140 has an iron core therein for tuning the same. Inductively coupled to the coil is the secondary tuned circuit including winding 142 across which condensers 143 and 144 are connected in series. The second limiter is also connected directly to the center tap between these condensers in a standard manner. The coil 142 includes a movable iron core therein controlled by the control knob 25 on the front panel for adjusting the center frequency of the discriminator. As previously stated, the output of the discriminator is applied to the first audio frequency amplifier stage, 73 with the output from this stage being applied through volume control potentiometer 145 to the power amplifier stage 74.

Squelch voltage is also applied to the stage 73 from the squelch stage 77. The output of the power amplifier stage 74 is applied through transformer 146 to the terminal 100 of the calibration switch 21. As previously stated, the output and the plate circuit of the discriminator are both connected to the metering switch 19. The output is applied through variable resistor 147 for controlling the slope of the discriminator to the terminal 4 of the metering switch 19 and the plate circuit is applied through resistor 148 to the terminal 5 of the metering switch 19.

Considering now the operation of the unit for monitoring a frequency modulation signal, let us assume that the monitor is for operation in the 160 megacycle band and it is desired to monitor a signal having a frequency of 163 megacycles. It is to be pointed out that the monitor is not limited for use in a particular frequency band, but by proper selection of the various tuning elements of the receivers and oscillator it may be made applicable to any desired frequency band. It will first be necessary to energize the power supply through the power switch 38 on the front panel. To energize the WWV receiver the knob 20 must be turned to connect the WWV filament and to provide the required volume. The switch for the WWV filaments is indicated as 20a in Fig. 4 and this switch also energizes the indicator light 15 along with the WWV filaments. The WWV selector switch 18 is then set to receive one of the two frequencies which are indicated A and B with the frequency selected depending upon the location and the time of day. The tuning condenser 17 will then be adjusted for optimum signal of the WWV receiver.

To use the WWV receiver for calibrating the crystal oscillator, the calibration switch is placed in the No. 1 position so that the audio output of the WWV receiver is applied to the conductor 80. The switch 22 will be in the position shown in Fig. 3 which is identified L, with the switch in this position connecting the loudspeaker 14 to the conductor 80. The output of the WWV receiver will therefore be connected to the loudspeaker. To adjust the crystal oscillator to the frequency of the receiver or to a sub-harmonic of the received WWV signal, the monitor channel selector switch 23 is placed in position 6 in which the crystal 121 and the condenser 26 are connected in parallel between the grid and plate of the triode 120. Since the crystal circuit is connected through condenser 130 to the input of the WWV receiver, as previously described, the crystal oscillator frequency is injected into the receiver and will produce a beat note with the received when the frequency varies from the received frequency. The crystal frequency can be adjusted by the trimmer condenser 26 which is designated "standard crystal adjustment" in Fig. 1. By listening to the beat notes when the WWV signal is not modulated and then listening to the amplitude variations and reducing the frequency thereof when the WWV signal is modulated, very close correspondence of the oscillator frequency with the received frequency can be obtained by well known beat frequency practices.

In the event that the received WWV signal is very weak it may be desired to reduce the amount of the oscillator signal injected into the WWV receiver and in such case the jumper 150 can be removed so that there is no direct connection between the crystal oscillator and the WWV receiver. There is sufficient connection through the capacities present because the oscillator and receiver, which are provided on the same chassis, to inject the oscillator signal in the receiver circuit. As the WWV signals are at 5, 10 and 15 megacycles, a 5 megacycle crystal is used at 121 and the oscillator frequency is standardized at 5 megacycles. When the receiver is tuned to receive a signal of either 10 or 15 megacycles, the second or third harmonic of the oscillator frequency would be present in sufficient amplitude for calibrating the crystal oscillator.

To calibrate the monitor receiver, the center frequency of the discriminator of the receiver is adjusted so that the receiver will be tuned to the desired frequency. The receiver frequency must be a harmonic of the standard crystal frequency and in the example stated may be 160 megacycles, this being the 32nd harmonic. To calibrate the monitor receiver, the WWV receiver must be turned off and this is accomplished through the control 20. The indicator light 15 will indicate when the receiver is off. The metering selector 19 is placed in the No. 4 position, the calibration switch in the third position, the switch 22 in the L position, and the monitor channel selector in the No. 6 position. When the signal from the crystal oscillator is of sufficient amplitude, the signal from the oscillator will cause the squelch of the monitor receiver to open so that the indicator light 16 will be illuminated. The carrier frequency meter 13 will indicate deviation of the signal from the oscillator with respect to the center frequency of the receiver. By adjusting the control 25 which moves the core in the secondary winding of the discriminator circuit, the receiver can be adjusted so that it is tuned exactly to the 32nd harmonic of the crystal oscillator. Although the Federal Communications Commission requires calibration of the frequency monitor only every six months, it is water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

ing, and in which the external connections must be rearranged for the different operations.

While there has been described a single embodiment of the invention, it is pointed out that this is merely illustrative and various changes and modifications can be made in the equipment illustrated within the intended scope of the invention as defined in the appended claims.

We claim:

1. A monitoring unit for utilizing a received standard frequency signal to measure the frequency displacement of a carrier wave from a preassigned frequency including in combination; an oscillator section for generating in alternation a first signal having a fundamental frequency substantially equal to the frequency of said standard signal accompanied by harmonics of said fundamental frequency, and a second signal which when heterodyned with a signal of said preassigned frequency produces a signal having a frequency equal to a selected multiple of said standard signal frequency; means for heterodyning said standard signal and said first oscillator signal to produce a beat signal; control means included in said oscillator for adjusting the frequency of said first oscillator signal to reduce the frequency of said beat signal to zero thereby establishing said first oscillator signal at said standard signal frequency; a frequency-modulation receiver including a frequency-discriminator network; means for supplying the adjusted first oscillator signal and associated harmonics to said receiver; tuning means included in said receiver for tuning said receiver to a selected harmonic of said adjusted oscillator signal corresponding to the aforesaid multiple of said standard signal frequency; means for heterodyning said carrier wave and said second oscillator signal and for supplying the resulting heterodyne signal to said receiver; and an indicating device coupled to said frequency-discriminator network during application of said last-mentioned heterodyne signal to said receiver for measuring the output of said discriminator in the presence of said last-mentioned heterodyne signal.

2. A monitoring unit for utilizing a received standard frequency signal to measure the frequency displacement of a carrier wave from a preassigned frequency including in combination: an oscillator section for generating in alternation a first signal having a fundamental frequency substantially equal to the frequency of said standard signal accompanied by harmonics of said fundamental frequency, and a second signal which when heterodyned with a signal of said preassigned frequency produces a signal having a frequency equal to the multiple of said standard signal frequency closest to said preassigned frequency; means for heterodyning said standard signal and said first oscillator signal to produce a beat signal; control means included in said oscillator for adjusting the frequency of said first oscillator signal to reduce the frequency of said beat signal to zero thereby establishing said first oscillator signal at said standard signal frequency; a frequency-modulation receiver including a frequency-discriminator network; means for supplying the adjusted first oscillator signal and associated harmonics to said receiver; tuning means included in said receiver for tuning said receiver to a selected harmonic of said adjusted oscillator signal corresponding to the aforesaid multiple of said standard signal frequency; means for heterodyning said carrier wave and said second oscillator signal and for supplying the resulting heterodyne signal to said receiver; and an indicating device coupled to said frequency-discriminator network during application of said last-mentioned heterodyne signal to said receiver for measuring the output of said discriminator in the presence of said last-mentioned heterodyne signal.

3. A monitoring unit for utilizing a received standard frequency signal to measure the frequency displacement of a carrier wave from a preassigned frequency including in combination: an oscillator section having at least two crystal-controlled frequency-determining networks for generating in alternation a first signal having a fundamental frequency substantially equal to the frequency of said standard signal accompanied by harmonics of said fundamental frequency, and a second signal which when heterodyned with a signal of said preassigned frequency produces a signal having a frequency equal to a selected multiple of said standard signal frequency; means for heterodyning said standard signal and said first oscillator signal to produce a beat signal; control means included in said oscillator for adjusting the frequency of said first oscillator signal to reduce the frequency of said beat signal to zero thereby establishing said first oscillator signal at said standard signal frequency; a frequency-modulation receiver including a frequency-discriminator network; means for supplying the adjusted first oscillator signal and associated harmonics to said receiver; tuning means included in said receiver for tuning said receiver to a selected harmonic of said adjusted oscillator signal corresponding to the aforesaid multiple of said standard signal frequency; means for heterodyning said carrier wave and said second oscillator signal and for supplying the resulting heterodyne signal to said receiver; and an indicating device coupled to said frequency-discriminator network during application of said last-mentioned heterodyne signal to said receiver for measuring the output of said discriminator in the presence of said last-mentioned heterodyne signal.

4. A monitoring unit for utilizing a received standard frequency signal to measure the frequency displacement of a frequency-modulation carrier wave from a preassigned frequency, and to measure the modulation deviation of said carrier including in combination: an oscillator section for generating in alternation a first signal having a fundamental frequency substantially equal to the frequency of said standard signal accompanied by harmonics of said fundamental frequency, and a second signal which when heterodyned with a signal of said preassigned frequency produces a signal having a frequency equal to a selected multiple of said standard signal frequency; means for heterodyning said standard signal and said first oscillator signal to produce a beat signal; control means included in said oscillator for adjusting the frequency of said beat signal to zero thereby establishing said first oscillator signal at said standard signal frequency; a frequency-modulation receiver including a frequency-discriminator network and an audio amplifier coupled thereto; means for supplying the adjusted first oscillator signal and associated harmonics to said receiver; tuning means included in said receiver for tuning said receiver to a selected harmonic of said adjusted oscillator signal corresponding to the aforesaid multiple of said standard signal frequency; means for heterodyning said carrier wave and said second oscillator signal and for supplying the resulting heterodyne signal to said receiver; an indicating device coupled to said frequency-discriminator network for measuring the output of said discriminator during the application of said last-mentioned heterodyne signal to said receiver; a calibrating audio oscillator; control means included in said audio oscillator for adjusting the amplitude of its output signal to a selected level; switching means for applying the output signal from said audio oscillator to the aforesaid audio amplifier; control means included in said audio amplifier for adjusting the gain thereof to a preselected level in the presence of said last-mentioned output signal; and an indicating device coupled to said audio amplifier for measuring the amplitude of the output signal developed thereby in the presence of said last-mentioned heterodyne signal.

5. A monitoring unit for utilizing a received standard frequency signal to measure the frequency displacement of a frequency-modulation carrier wave from a preassigned frequency, and to measure the modulation deviation of said carrier including in combination: an oscillator section for generating in alternation a first signal having a fundamental frequency substantially equal to the frequency of said standard signal accompanied by harmonics of said fundamental frequency, and a second signal which when heterodyned with a signal of said preassigned frequency produces a signal having a frequency equal to a selected multiple of said standard signal frequency; a receiver for said standard frequency signal including a mixer stage for heterodyning said standard signal and said first oscillator signal to produce a beat signal, and an audio amplifier for amplifying said beat signal; control mens included in said oscillator for adjusting the frequency of said first oscillator signal to reduce the frequency of said beat signal to zero thereby establishing said first oscillator signal at said standard signal frequency; a frequency-modulation receiver including a frequency-discriminator network and an audio amplifier coupled thereto; means for supplying the adjusted first oscillator signal and associated harmonics to said frequency-modulation reeciver; tuning means included in said frequency-modulation receiver for tuning